(12) United States Patent
Pal

(10) Patent No.: US 8,294,831 B2
(45) Date of Patent: Oct. 23, 2012

(54) SET-TOP BOX RECEIVER SOFT CONTROL SYSTEM AND METHOD

(75) Inventor: Rajiv Singh Cullen Pal, Denver, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 381 days.

(21) Appl. No.: 12/251,250

(22) Filed: Oct. 14, 2008

(65) Prior Publication Data

US 2010/0095346 A1 Apr. 15, 2010

(51) Int. Cl.
*H04N 5/44* (2011.01)

(52) U.S. Cl. .......... 348/734; 725/38; 725/151; 715/835; 715/839; 715/866

(58) Field of Classification Search .................. None
See application file for complete search history.

(56) References Cited

U.S. PATENT DOCUMENTS

| | | | | |
|---|---|---|---|---|
| 5,604,544 A | * | 2/1997 | Bertram | 348/601 |
| 5,675,395 A | * | 10/1997 | Martin et al. | 348/734 |
| 5,936,611 A | * | 8/1999 | Yoshida | 345/158 |
| 6,104,334 A | * | 8/2000 | Allport | 341/175 |
| 6,215,417 B1 | * | 4/2001 | Krass et al. | 341/20 |
| 6,292,283 B1 | * | 9/2001 | Grandbois | 398/107 |
| 6,501,516 B1 | * | 12/2002 | Clapper | 348/734 |
| 7,132,973 B2 | * | 11/2006 | Jindal | 341/176 |
| 2006/0010481 A1 | * | 1/2006 | Wall et al. | 725/151 |
| 2008/0263618 A1 | * | 10/2008 | White | 725/133 |
| 2009/0161027 A1 | * | 6/2009 | Hardacker et al. | 348/734 |
| 2009/0233593 A1 | * | 9/2009 | Ergen et al. | 455/420 |

\* cited by examiner

*Primary Examiner* — Pankaj Kumar
*Assistant Examiner* — Timothy Newlin
(74) *Attorney, Agent, or Firm* — Lowe Graham Jones PLLC

(57) ABSTRACT

A set-top box is constructed including a processor, an input port, an auxiliary input port, and an output port. The input port is electrically coupled to the processor, and is configured to receive first control signals from a remote control. The auxiliary input port is also electrically coupled to the processor, and is configured to receive second control signals from an auxiliary remote control and send the second control signals to the processor. The output port is electrically coupled to the processor, and is configured to send graphical representations of a remote control to a display. The processor is configured to compose a graphical representation of the remote control, receive a second control signal, modify the graphical representation of the remote control in response to the second control signal, and send the graphical representation to the output port for display.

20 Claims, 6 Drawing Sheets

SET-TOP BOX RECEIVER SOFT CONTROL SYSTEM AND METHOD

BACKGROUND OF THE INVENTION

1. Field of the Invention

This disclosure is related to the field of set-top boxes, and, in particular, to set-top boxes including a soft control feature.

2. Description of the Prior Art

Set-top boxes are used in a wide variety of consumer applications. For example, satellite television set-top boxes are used to receive, decode, and display satellite television signals on a television. Many set-top boxes include remote controls capable of controlling the set-top box in a wide variety of manners. These remote controls are often complex and include a large quantity of buttons or other controls. In contrast, the set-top box itself often has a very limited set of controls built into the box, since it is designed for control exclusively by the remote control.

Current set-top boxes typically include a power switch, and perhaps a small number of very simple control buttons, such as for incrementing and decrementing the presently tuned channel. Since the remote controls are typically smaller than the set-top box, and are often wireless devices, they may be located separately from the set-top box, making them vulnerable to misplacement. When a remote control is lost, the user is left without any control over the set-top box other than the very limited controls built into the box.

SUMMARY OF THE INVENTION

A set-top box is constructed including a processor, an input port, an auxiliary input port, and an output port. The input port is electrically coupled to the processor, and is configured to receive first control signals from a remote control. The auxiliary input port is also electrically coupled to the processor, and is configured to receive second control signals from an auxiliary remote control and send the second control signals to the processor. The output port is electrically coupled to the processor, and is configured to send graphical representations of a remote control to a display. The processor is configured to compose a graphical representation of the remote control, receive a second control signal, modify the graphical representation of the remote control in response to the second control signal, and send the graphical representation to the output port for display.

DETAILED DESCRIPTION OF THE PREFERRED EMBODIMENT

Figure 1:
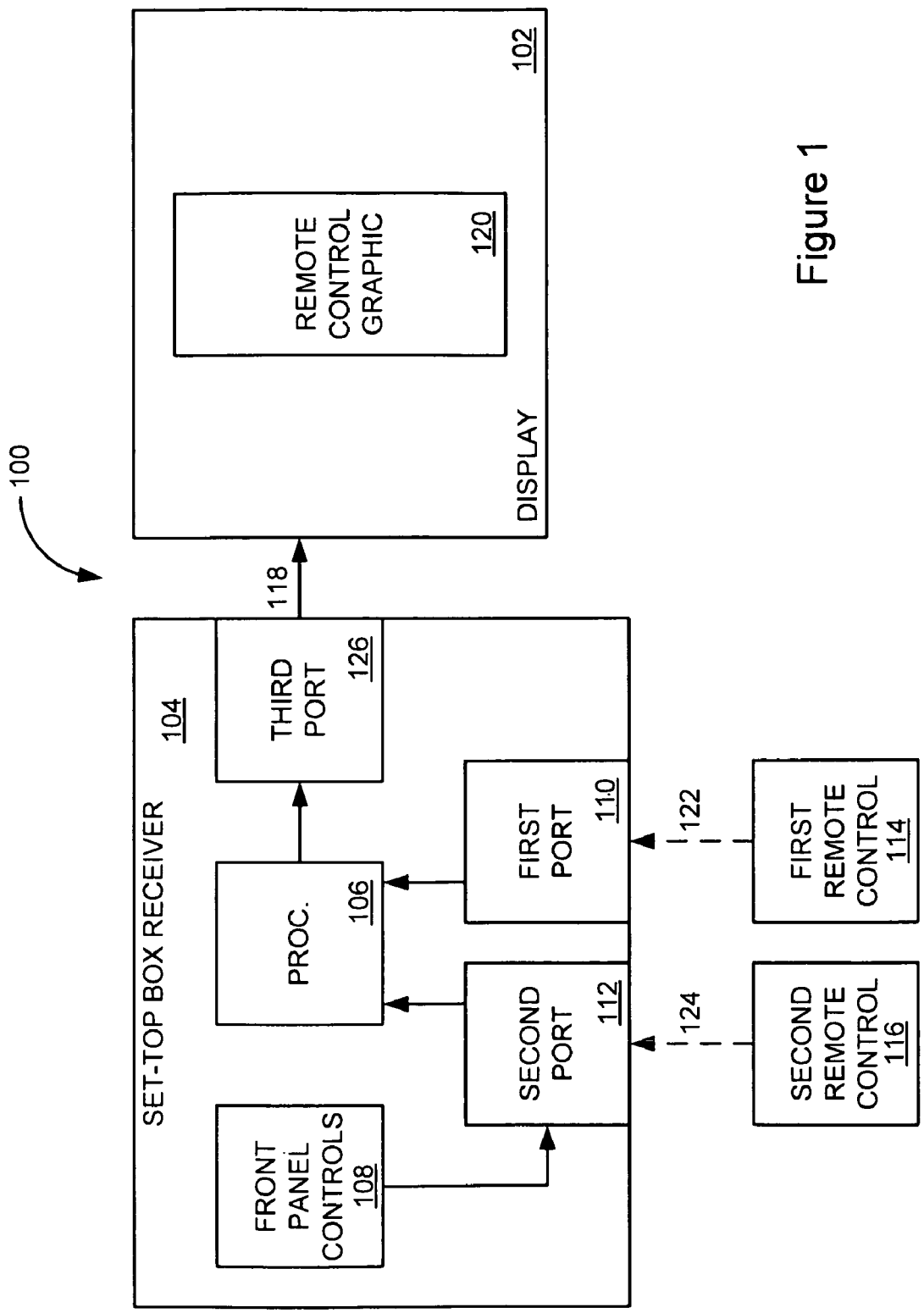
FIG. 1 is a block diagram of a set-top box receiving system.

FIG. 1 is a block diagram of a set-top box receiving system 100. In this example, set-top box receiving system 100 includes set-top box receiver 104 and display 102. Set-top box receiver 104 includes processor 106, front panel controls 108, first port 110, second port 112, and third port 126.

Third port 126 of set-top box receiver 104 is coupled to display 102 through link 118, typically a video cable. First remote control 114 is coupled to first port 110 through link 122, and second remote control 116 is coupled to second port 112 through link 124. Links 122 and 124 may be wired or wireless links. Some links may operate through infrared signals, while others may use radio frequency signals. Still other links may be directly wired.

Figure 6:
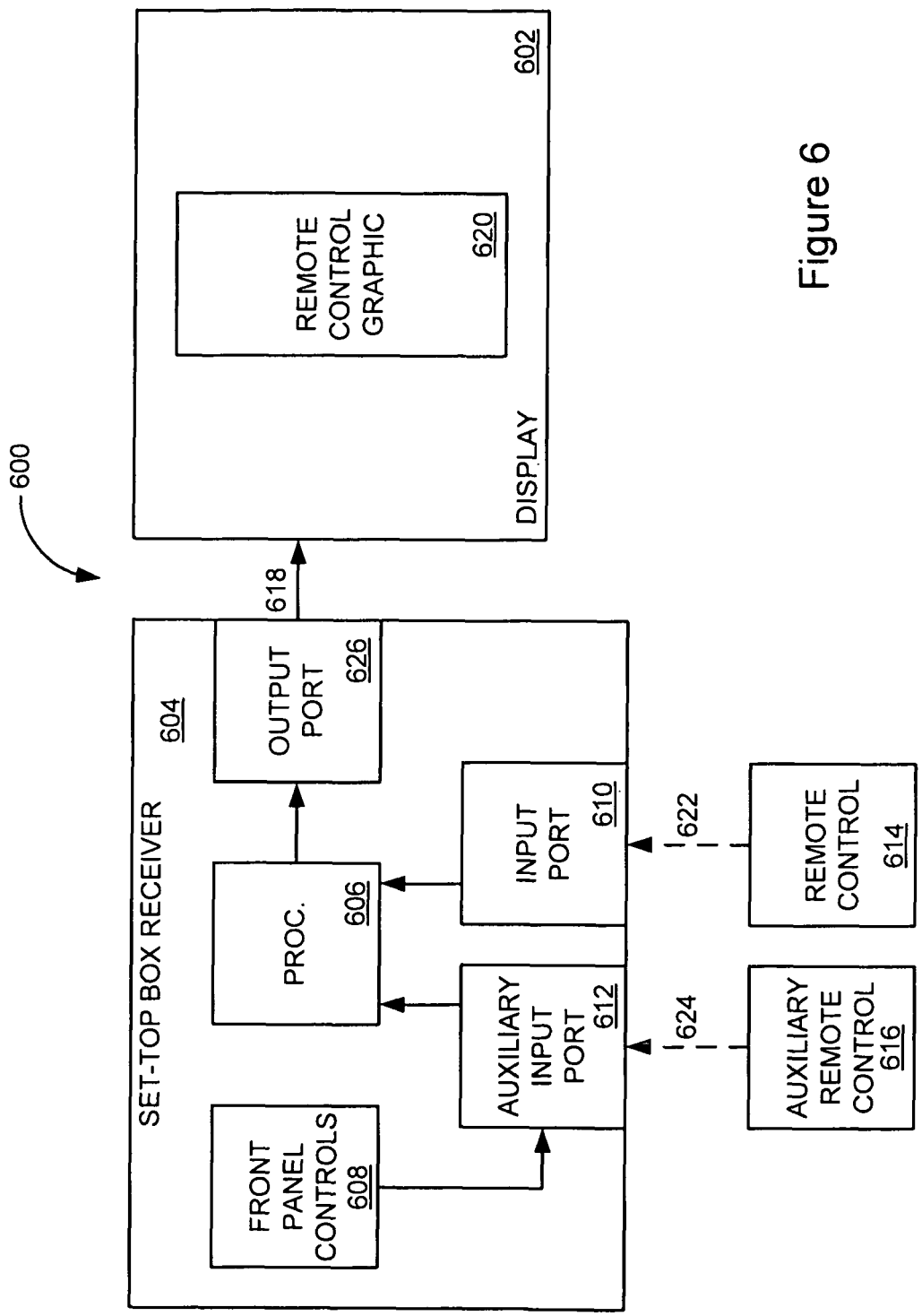
FIG. 6 is a block diagram of a set-top box receiving system.

In some embodiments, first port 110 is also termed an input port, second port 112 is termed an auxiliary input port, and third port 126 is termed an output port. First remote control 114 may be referred to as a remote control, while second remote control 116 may be referred to as an auxiliary remote control. Such an embodiment is illustrated in FIG. 6 and described in detail below.

Processor 106 is electrically coupled with first port 110, second port 112, and third port 126. In this example, set-top box receiver 104 includes a quantity of front panel controls 108. Front panel controls 108 are coupled to processor 106 through second port 112 and may act as a second remote control in some examples. First remote control 114 includes control devices (not shown) such as buttons used for controlling set-top box receiver 104. Front panel controls 108 include a subset of the control devices present in first remote control 114. For example, these front panel controls 108 may include a power switch, direction controls, and a select button, while first remote control 114 may include a large number of additional control devices used to access all of the functionality present in set-top box 104.

Figure 4:
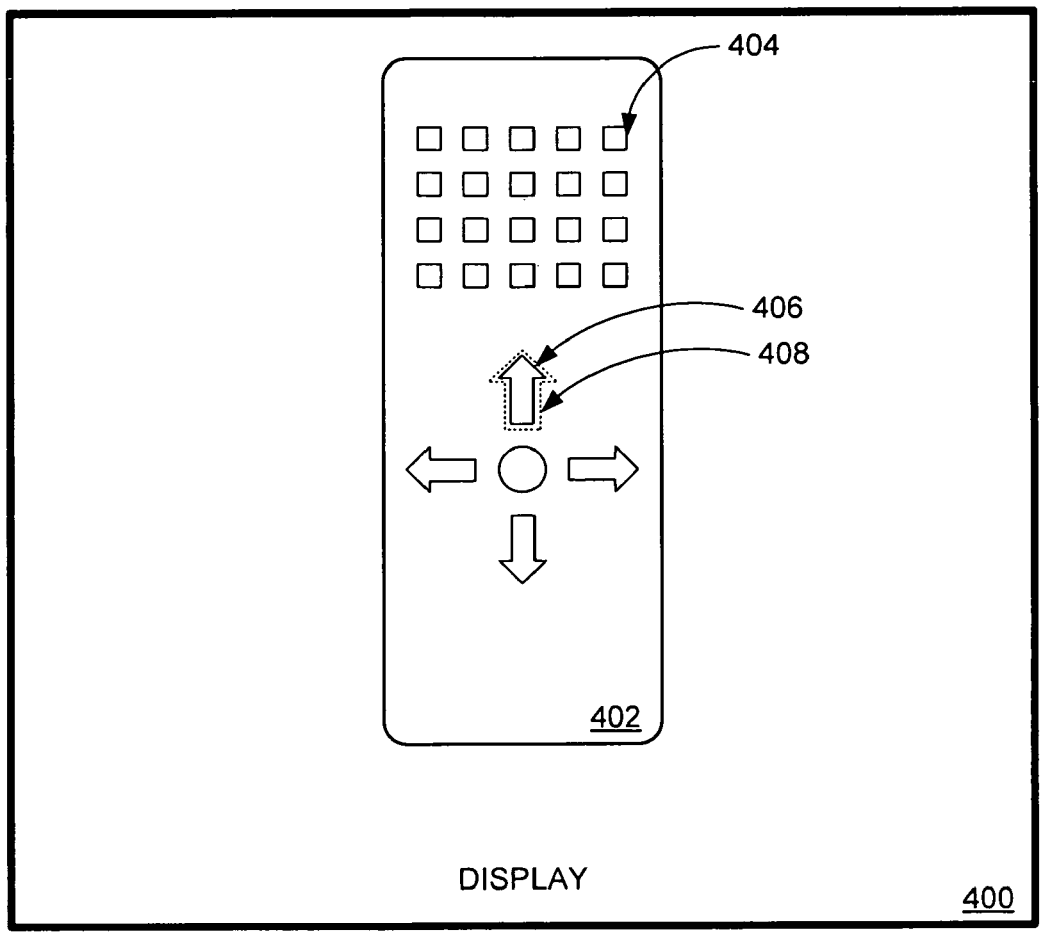
FIG. 4 illustrates a display including a graphical representation of a remote control.
Figure 5:
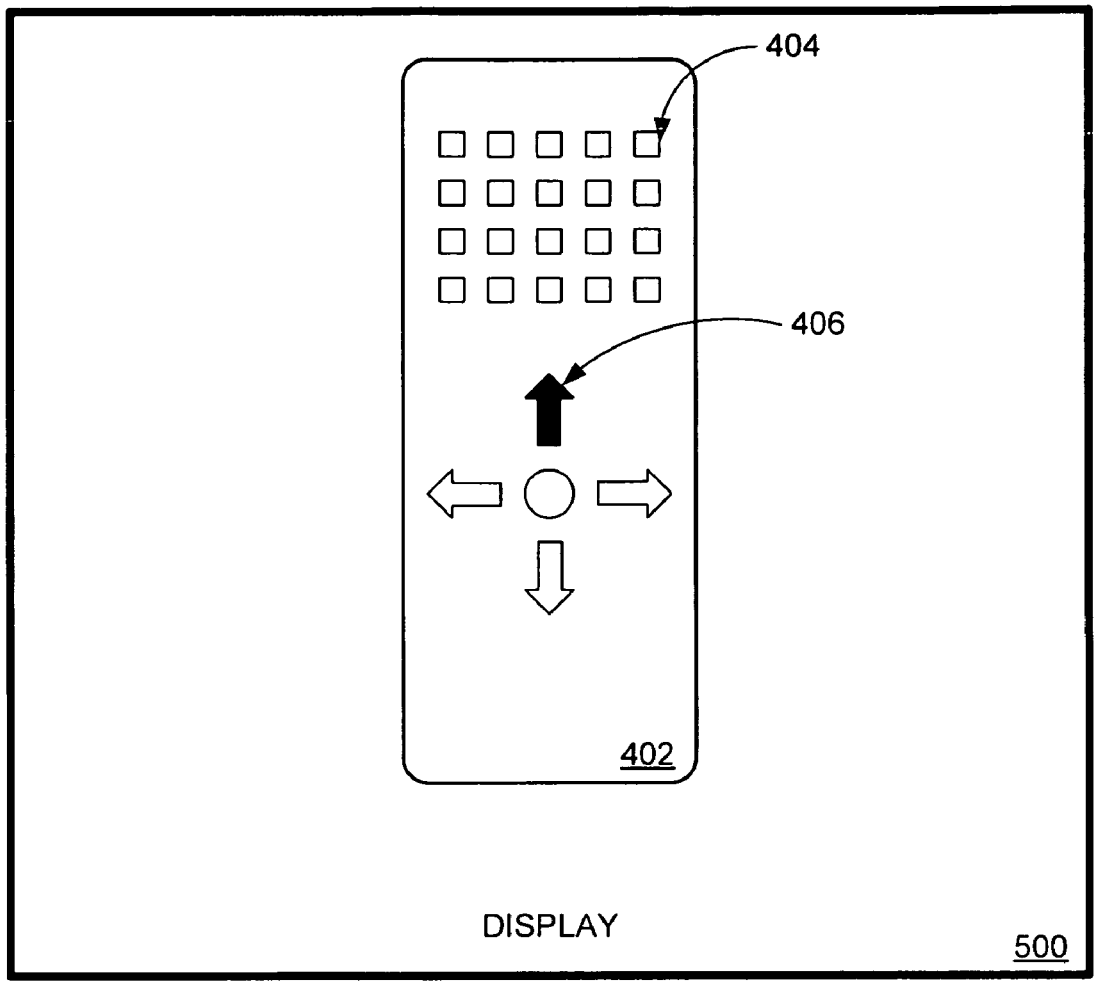
FIG. 5 illustrates a display including a graphical representation of a remote control.

When first remote control 114 is misplaced, a user may be unable to access all of the functionality present in set-top box 104. By displaying an interactive graphical representation 120 of first remote control 114 on display 102, and allowing the use of second remote control 116, a user is able to access all of the functionality of set-top box 104. For example, set-top box receiver 104 may create a graphical representation 120 of first remote control 114 and send it to output port 126 for viewing on display 102. An example display 102 is illustrated in FIGS. 4 and 5.

In this example, processor 106 is configured to receive control signals from second remote control 116 through second port 112 and to modify the graphical representation of first remote control 114 on display 102 in response to these control signals. Second remote control 116 may be any of a wide variety of control devices. For example, a set of front panel controls, a computer mouse, a joystick, a video game controller, a television controller, a remote control for a different set-top box, or the like may all be used as second remote controls in various embodiments of set-top box receiving system 100.

Various embodiments of second port 112 may include one or more different input ports. For example, in order to allow the use of a wide range of second remote controls, second port 112 may include a Universal Serial Bus (USB) port, an infrared port, and a radio frequency port. Other examples may use other types and configurations of second ports 112 as desired.

In an example, front panel controls 108 may include sufficient controls to operate as a second remote control. In this case, set-top box receiver 108 may not necessarily include an external second port 112, but use the front panel controls 108 as second remote control 116.

In still other examples, first port 110 and second port 112 may be physically combined into a single port capable of receiving control signals from both first remote control 114 and second remote control 116. First port 110 and second port 112 are illustrated in FIG. 1 as physically separate devices for purposes of clarity.

Figure 3:
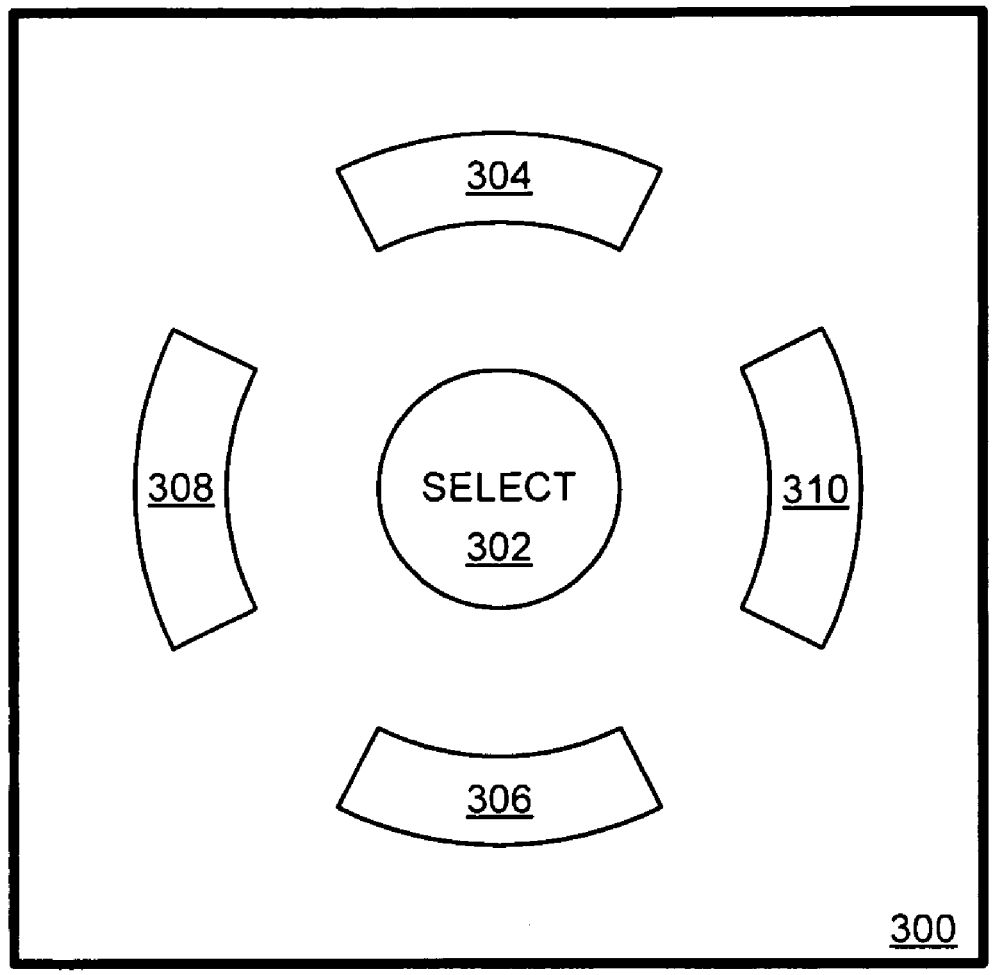
FIG. 3 illustrates an auxiliary remote control.

When set-top box receiver 104 is responding to second remote control 116, it displays a graphical representation 120 of first remote control 114 (or any other remote control) on display 102. This graphical representation 120 is modified by set-top box receiver 104 responsive to the control signals from second remote control 116. For example, second remote control 116 may include up, down, left, right, and select controls. An example second remote control 116 is illustrated in FIG. 3. The graphical representation 120 of first remote control 114 includes a cursor indicating one of the buttons on the graphical representation 120 of first remote control 114. When the up, down, left, and right controls are selected on second remote control 116, the cursor on the graphical representation 120 moves to a different button according to the direction selected.

When the cursor is located on a graphical representation of a button that the user wishes to select, the select control on second remote control 116 may be pressed. This causes second remote control 116 to send a control signal to set-top box receiver 104. In response to this control signal, set-top box receiver 104 performs the function corresponding to the button selected on the graphical representation 120 of first remote control 114. In this manner, a user may operate set-top box receiver 104 to perform any operation available from first remote control 114. The graphical representation 120 of first remote control 114 on display 102 may be in any size, shape, and location as necessary in any particular embodiment.

Set-top box receiver 104 may contain additional elements not illustrated in FIG. 1 for purposes of clarity. These elements may include a down-converter, one or more tuners, a demodulator, demultiplexer, decryption circuit, audio and video decoders, and the like, for receiving the satellite signals and transferring them to the television or other output device.

In one embodiment, processor 106 may be one or more microprocessors, microcontrollers, digital signal processors (DSPs), or any other processor configured to execute software instructions for performing the various tasks identified with the processor 106, such as coordinating the activities of the other components of the set-top box receiver 104, as well as the specific operations discussed in greater detail below. The software may be stored in a data storage device, or a memory located internal to the processor 106. In another example, processor 106 may be a collection of hardware logic circuitry to perform the functions described below, or a combination of software and hardware elements.

In some examples, the graphical representation 120 of a remote control on display 102 may be a representation of a remote control different from the first remote control 114 in possession of the user. This allows a user to test the functionality of various different remote controls prior to purchasing an additional remote control.

Figure 2:
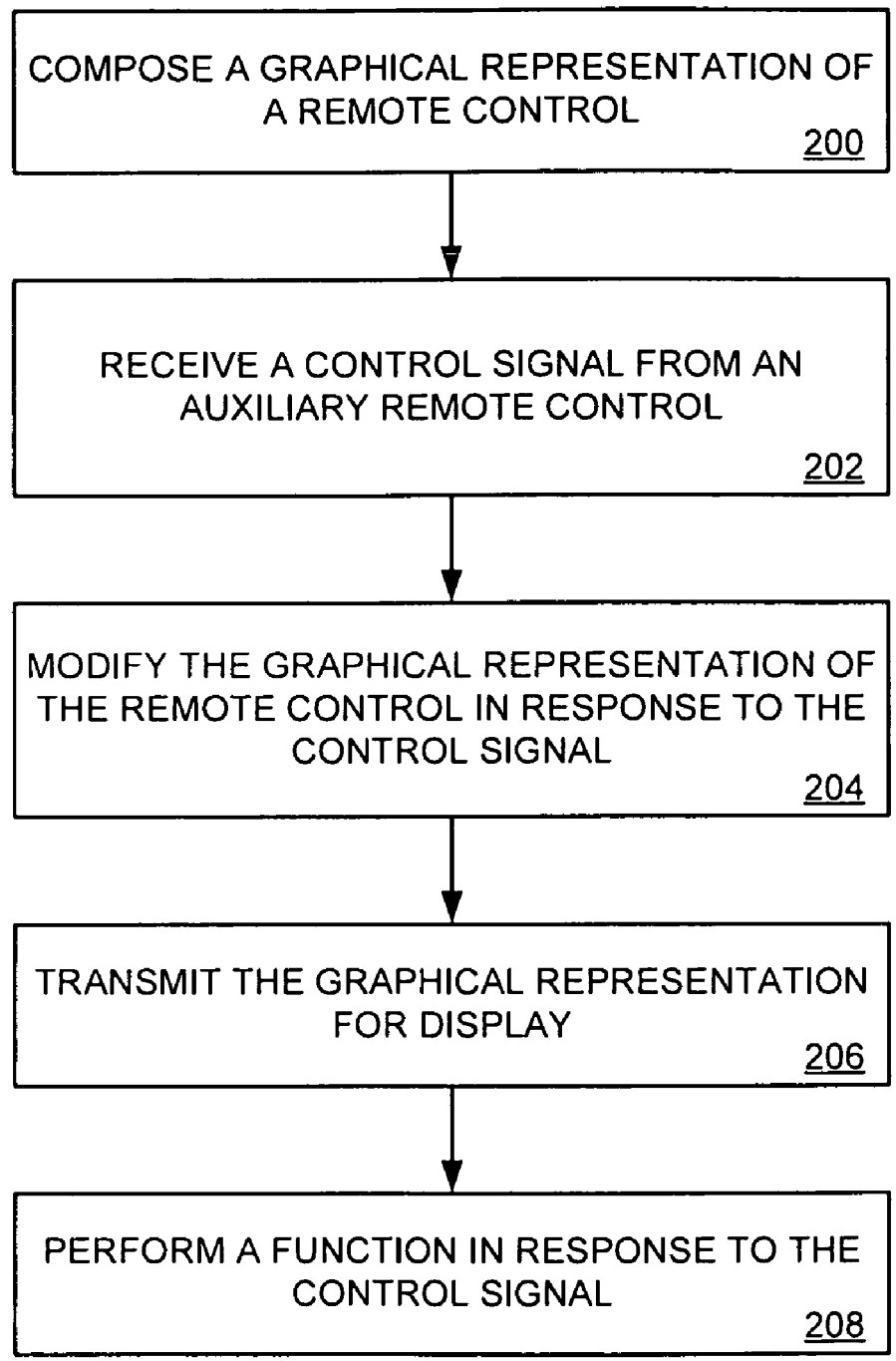
FIG. 2 is a flow chart of a method for operating a set top box.

FIG. 2 is a flow chart of a method for operating a set top box. Set-top box receiver 104 composes a graphical representation 120 of (first) remote control 114 (operation 200). Set-top box receiver 104 also receives a control signal from an auxiliary (second) remote control 116 (operation 202). In response to this control signal, set-top box receiver 104 modifies the graphical representation 120 of (first) remote control 114 (operation 204).

This modification may include moving a cursor over various graphical representations of buttons within graphical representation 120 of (first) remote control 114. In other examples, this modification may include indicating the selection of a button within graphical representation 120 of (first) remote control 114.

Set-top box receiver 104 transmits the graphical representation 120 for display on display 102 (operation 206). In some examples, set-top box receiver 104 also performs a function in response to the control signal (operation 208). Various functions may be performed by set-top box receiver 104 in response to the control signal. Such functions may include changing a channel, adjusting a volume level, selecting a program for recording, or the like. Any function capable of control by (first) remote control 114 may be performed in response to the control signal.

FIG. 3 illustrates an auxiliary (second) remote control 300. In this example, auxiliary (second) remote control 300 includes five buttons. These five buttons include four direction buttons and select button 302. The four direction buttons include up button 304, down button 306, left button 308, and right button 310. These buttons are used in conjunction with set-top box receiver 104 to modify a graphical representation 120 of (first) remote control 114 on display 102, and to cause set-top box receiver 104 to perform one or more functions.

For example, the four direction buttons 304, 306, 308, and 310 may be used to control the position of a cursor over the buttons shown in the graphical representation 120 of (first) remote control 114 on display 102. The select button 302 is then used to activate the button shown in the graphical representation 120 of (first) remote control 114 on display 102. The graphical representation 120 of (first) remote control 114 on display 102 is further illustrated in FIGS. 4 and 5.

FIG. 4 illustrates a display including a graphical representation of a remote control on a display 400. In this example, display 400 includes a graphical representation of a remote control 402. This graphical representation includes a large number of buttons 404. In this illustration, up arrow button 406 is shown designated by cursor 408, represented by a dashed line surrounding up arrow button 406. In one example, this cursor may be moved to other buttons 404 through use of the direction buttons included on auxiliary (second) remote control 300.

FIG. 5 illustrates a display including a graphical representation of a remote control on a display 500. Display 500 includes a graphical representation of a remote control 402, similar to that of FIG. 4. In this example, up arrow button 406 has been selected using the select button 302 from auxiliary remote control 300. In response to this selection, set-top box receiver 104 has darkened the graphical representation of up arrow button 406, and has performed the function corresponding to up arrow button 406.

Depending upon the nature of the function performed by set-top box receiver 104, display 500 may continue showing the graphical representation of a remote control 402 or it may switch to a display corresponding to the function. For example if a channel has been selected for viewing, display 500 will switch to the content of that channel and cease displaying the graphical representation of a remote control 402. Likewise, if a programming guide has been selected, display 500 will switch to the programming guide. In some other examples, the graphical representation of a remote control 402 may be modified in size and location within display 500 so that other information, such as a programming guide, may be shown in addition to the graphical representation.

FIG. 6 is a block diagram of a set-top box receiving system 600 similar to that illustrated in FIG. 1. In this example, set-top box receiving system 600 includes set-top box receiver 604 and display 602. Set-top box receiver 604 includes processor 606, front panel controls 608, input port 610, auxiliary input port 612, and output port 626.

Output port 626 of set-top box receiver 604 is coupled to display 602 through link 618, typically a video cable. Remote control 614 is coupled to input port 610 through link 622, and auxiliary remote control 616 is coupled to auxiliary input port 612 through link 624. Links 622 and 624 may be wired or wireless links. Some links may operate through infrared signals, while others may use radio frequency signals. Still other links may be directly wired.

In some embodiments, input port 610 is also termed a first port, auxiliary input port 612 is termed a second port, and output port 626 is termed a third port. Remote control 614 may be referred to as a first remote control, while auxiliary remote control 616 may be referred to as a first remote control. Such an embodiment is illustrated in FIG. 1 and described in detail above.

Processor 606 is electrically coupled with input port 610, auxiliary input port 612, and output port 626. In this example, set-top box receiver 604 includes a quantity of front panel controls 608. Front panel controls 608 are coupled to processor 606 through auxiliary input port 612 and may act as an auxiliary remote control in some examples. Remote control 614 includes control devices (not shown) such as buttons used for controlling set-top box receiver 604. Front panel controls 608 include a subset of the control devices present in remote control 614. For example, these front panel controls 608 may include a power switch, direction controls, and a select button, while remote control 614 may include a large number of additional control devices used to access all of the functionality present in set-top box 604.

When remote control 614 is misplaced, a user may be unable to access all of the functionality present in set-top box 604. By displaying an interactive graphical representation 620 of remote control 614 on display 602, and allowing the use of auxiliary remote control 616, a user is able to access all of the functionality of set-top box 604. For example, set-top box receiver 604 may create a graphical representation 620 of remote control 614 and send it to output port 626 for viewing on display 602, such as the display illustrated in FIGS. 4 and 5.

In this example, processor 606 is configured to receive control signals from auxiliary remote control 616 through auxiliary input port 612 and to modify the graphical representation of remote control 614 on display 602 in response to these control signals. Auxiliary remote control 616 may be any of a wide variety of control devices. For example, a set of front panel controls, a computer mouse, a joystick, a video game controller, a television controller, a remote control for a different set-top box, or the like may all be used as auxiliary remote controls in various embodiments of set-top box receiving system 600.

Various embodiments of auxiliary input port 612 may include one or more different input ports. For example, in order to allow the use of a wide range of auxiliary remote controls, auxiliary input port 612 may include a Universal Serial Bus (USB) port, an infrared port, and a radio frequency port. Other examples may use other types and configurations of auxiliary input ports 612 as desired.

In an example, front panel controls 608 may include sufficient controls to operate as an auxiliary remote control. In this case, set-top box receiver 608 may not necessarily include an external auxiliary input port 612, but use the front panel controls 608 as the auxiliary remote control 616.

In still other examples, input port 610 and auxiliary input port 612 may be physically combined into a single input port capable of receiving control signals from both remote control 614 and auxiliary remote control 616. Input port 610 and auxiliary input port 612 are illustrated in FIG. 6 as physically separate devices for purposes of clarity.

When set-top box receiver 604 is responding to an auxiliary remote control 616, it displays a graphical representation 620 of remote control 614 (or any other remote control) on display 602. This graphical representation 620 is modified by set-top box receiver 604 responsive to the control signals from auxiliary remote control 616. For example, auxiliary remote control 616 may include up, down, left, right, and select controls. An example auxiliary remote control 616 is illustrated in FIG. 3. The graphical representation 620 of remote control 614 includes a cursor indicating one of the buttons on the graphical remote control 620. When the up, down, left, and right controls are selected on auxiliary remote control 616, the cursor on the graphical representation 620 moves to a different button according to the direction selected.

When the cursor is located on a graphical representation of a button that the user wishes to select, the select control on the auxiliary remote control 616 may be pressed. This causes auxiliary remote control 616 to send a control signal to set-top box receiver 604. In response to this control signal, set-top box receiver 604 performs the function corresponding to the button selected on the graphical representation 620 of remote control 614. In this manner, a user may operate set-top box receiver 604 to perform any operation available from remote control 614. The graphical representation 620 of remote control 614 on display 602 may be in any size, shape, and location as necessary in any particular embodiment.

Set-top box receiver 604 may contain additional elements not illustrated in FIG. 6 for purposes of clarity. These elements may include a down-converter, one or more tuners, a demodulator, demultiplexer, decryption circuit, audio and video decoders, and the like, for receiving the satellite signals and transferring them to the television or other output device.

In one embodiment, processor 606 may be one or more microprocessors, microcontrollers, digital signal processors (DSPs), or any other processor configured to execute software instructions for performing the various tasks identified with the processor 606, such as coordinating the activities of the other components of the set-top box receiver 604, as well as the specific operations discussed in greater detail below. The software may be stored in a data storage device, or a memory located internal to the processor 606. In another example, processor 606 may be a collection of hardware logic circuitry to perform the functions described below, or a combination of software and hardware elements.

In some examples, the graphical representation 620 of a remote control on display 602 may be a representation of a remote control different from the remote control 614 in possession of the user. This allows a user to test the functionality of various different remote controls prior to purchasing an additional remote control.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A set-top box, comprising:
   a processor;
   a first port electrically coupled to the processor, configured to receive a first control signal from a first remote control, wherein the first port is configured to communicate with at least the first remote control using a first link, wherein the first remote control includes a plurality of buttons thereon configured to control operation of the set-top box;

a second port electrically coupled to the processor, configured to receive a second control signal from a second remote control and send the second control signal to the processor, wherein the second port is configured to communicate with at least the second remote control using a second link that is different from the first link, and wherein the second remote control is configured to control another electronic device; and a third port electrically coupled to the processor, configured to send a graphical representation of the first remote control to a display, wherein the graphical representation of the first remote control includes a graphical representation of a plurality of buttons of the first remote control and includes a graphical representation of a cursor that indicates a first selectable one of the plurality of buttons of the graphical representation of the first remote control;

wherein the processor is configured to:
generate the graphical representation of the first remote control,
modify the graphical representation of the first remote control in response to the second control signal,
wherein the second control signal received from the second remote control corresponds to one of an up direction, a down direction, a left direction and a right direction,
wherein the cursor presented on the modified graphical representation of the first remote control is moved to an adjacent one of the buttons on the graphical representation of the first remote control in accordance with the corresponding direction of the second control signal to indicate that the adjacent button is a second selectable one of the plurality of the graphically represented buttons of the first remote control,
wherein the second selectable one of the plurality of the graphically represented buttons of the first remote control is selectable in response to receiving a third control signal at the second port that is generated by the second remote control, and
wherein the second selectable one of the plurality of the graphically represented buttons of the first remote control is associated with a function of a corresponding one of the plurality of buttons of the first remote control; and
send the modified graphical representation of the first remote control to the third port for sending to the display.

2. The set-top box of claim 1,
wherein the processor is also configured to perform a function associated with the second selectable one of the plurality of the graphically represented buttons of the first remote control in response to the third control signal.

3. The set-top box of claim 1,
wherein the display is remote from the set-top box, and
wherein the second control signal that corresponds to one of the up direction, the down direction, the left direction and the right direction is received from at least one of a set of front panel controls residing on the set-top box.

4. The set-top box of claim 1,
wherein the second remote control is a joystick, and wherein the second control signal is generated by one of a first movement of the joystick that corresponds to the up direction, a second movement of the joystick that corresponds to the down direction, a third movement of the joystick that corresponds to the left direction, and a fourth movement of the joystick that corresponds to the right direction.

5. The set-top box of claim 1,
wherein the second remote control is a computer mouse, and wherein the second control signal is generated by one of a first movement of the computer mouse that corresponds to the up direction, a second movement of the computer mouse that corresponds to the down direction, a third movement of the computer mouse that corresponds to the left direction, and a fourth movement of the computer mouse that corresponds to the right direction.

6. The set-top box of claim 1,
wherein the second remote control is a video game controller, and wherein the second control signal is generated by actuation of a first button of the video game controller that corresponds to the up direction, is generated by actuation of a second button of the video game controller that corresponds to the down direction, is generated by actuation of a third button of the video game controller that corresponds to the left direction, and is generated by actuation of a fourth button of the video game controller that corresponds to the right direction.

7. The set-top box of claim 1,
wherein the second remote control is a television remote control that is unable to control the set top box, and wherein the second control signal is generated by actuation of a first button of the second remote control that corresponds to the up direction, is generated by actuation of a second button of the second remote control that corresponds to the down direction, is generated by actuation of a third button of the second remote control that corresponds to the left direction, and is generated by actuation of a fourth button of the second remote control that corresponds to the right direction.

8. The set-top box of claim 1,
wherein the second port is an infrared receiver; and
wherein the second remote control emits infrared control signals.

9. The set-top box of claim 1,
wherein the second port is a radio frequency receiver; and
wherein the second remote control emits radio frequency control signals.

10. A method of operating a set-top box, wherein the set-top box includes a first port configured to communicate with a first remote control using a first link, wherein the first remote control includes a plurality of buttons thereon configured to control operation of the set-top box, wherein the set-top box includes a second port configured to communicate with a second remote control using a second link that is different from the first link, and wherein the second remote control is configured to control another electronic device that is different from the set-top box, comprising:
composing a graphical representation of the first remote control, wherein the graphical representation of the first remote control includes a plurality of graphically represented buttons corresponding to the plurality of buttons of the first remote control, and wherein the graphical representation of the first remote control includes a graphical representation of a cursor that indicates a first selectable one of the plurality of buttons of the graphical representation of the first remote control;

transmitting the graphical representation of the first remote control to a display, wherein the display is configured to display the graphical representation of the first remote control;

receiving a first control signal from the second remote control over the second link at the second port, wherein the first control signal received from the second remote control corresponds to one of an up direction, a down direction, a left direction and a right direction;

modifying the graphical representation of the first remote control in response to the first control signal, wherein the cursor presented on the modified graphical representation of the first remote control is moved to an adjacent one of the buttons of the plurality of the graphically represented buttons of the first remote control in accordance with the first control signal, and wherein the adjacent graphically represented button is selectable based on a second control signal received from the second remote control; and transmitting the modified graphical representation of the first remote control to the display.

11. The method of claim 10, further comprising:

identifying a function performed by the set-top box in response to actuation of a button on the first remote control that corresponds to the adjacent graphically represented button;

associating the cursor with the function, wherein the cursor identifies the adjacent one of the buttons of the plurality of the graphically represented buttons of the first remote control;

receiving the second control signal from the second remote control, wherein the second control signal corresponds to actuation of a select button on the second remote control; and performing the function in response to the second control signal that is associated with the adjacent graphically represented button.

12. The method of claim 10, wherein the display is remote from the set-top box, and wherein receiving the control signal comprises:

receiving the first control signal that corresponds to a one of an up direction, a down direction, a left direction and a right direction is received from at least one of a set of front panel controls of the set-top box.

13. The method of claim 10, wherein the second remote control comprises at least an up control, a down control, a right control, and a left control, a select control, and wherein receiving the control signal comprises:

receiving the second control signal corresponding to a user selection of one of the up control, the down control, the right control, and the left control; and in response to the second control signal corresponding to the user selection of the up control on the second remote control, modifying the graphical representation of the first remote control to change a currently selected one of the plurality of the graphically represented buttons to a new selected one of the plurality of the graphically represented buttons that is above the currently selected one of the plurality of the graphically represented buttons;

in response to the second control signal corresponding to the user selection of the down control on the second remote control, modifying the graphical representation of the first remote control to change the currently selected one of the plurality of the graphically represented buttons to a new selected one of the plurality of the graphically represented buttons that is below the currently selected one of the plurality of the graphically represented buttons;

in response to the second control signal corresponding to the user selection of the right control on the second remote control, modifying the graphical representation of the first remote control to change the currently selected one of the plurality of the graphically represented buttons to a new selected one of the plurality of the graphically represented buttons that is right of the currently selected one of the plurality of the graphically represented buttons; and in response to the second control signal corresponding to the user selection of the left control on the second remote control, modifying the graphical representation of the first remote control to change the currently selected one of the plurality of the graphically represented buttons to a new selected one of the plurality of the graphically represented buttons that is left of the currently selected one of the plurality of the graphically represented buttons.

14. The method of claim 10, wherein the second remote control comprises at least a select control, and wherein receiving the control signal comprises:

receiving the control signal corresponding to a user selection of the select control; and performing a function in response to the control signal that is associated with a currently selected one of the plurality of the graphically represented buttons of the first remote control.

15. A method for operating a set-top box, wherein the set-top box includes a first port configured to communicate using a first link and a second port configured to communicate using a second link that is different from the first link, wherein the first port is configured to receive a control signal from a first remote control configured to control the set-top box so that the set-top box performs at least one function associated with the received control signal, wherein the second port is configured to receive control signals from a second remote control that is unable to control the set-top box, the method comprising:

receiving a first control signal from the second remote control at the second port;

transmitting a first graphical representation of the first remote control to a display in response to receiving the first control signal, wherein the first graphical representation of the first remote control includes a plurality of the graphically represented buttons of the first remote control and a cursor, and wherein the cursor indicates a selectable first one of the plurality of the graphically represented buttons of the first remote control;

receiving a second control signal from the second remote control at the second port, wherein the second control signal corresponds to movement of the cursor in one of an up direction, a down direction, a left direction and a right direction;

generating a second graphical representation of the first remote control in response to the second control signal, wherein the cursor presented on the second graphical representation of the first remote control is moved to an adjacent graphically represented button of the first remote control, and wherein the adjacent graphically represented button of the first remote control is selectable based on a received third control signal from the second remote control; and transmitting the second graphical representation of the first remote control to the display, wherein the cursor identifies the adjacent graphically represented button.

16. The method of claim 15, wherein the second remote control comprises at least a select control, and further comprising:
    identifying a function of the adjacent graphically represented button of the first remote control;
    associating the cursor with the function;
    receiving a third control signal from the second remote control at the second port, wherein the third control signal is initiated in response to a user selection of the select control on the second remote control; and
    performing a function in response to receiving the third control signal, wherein the performed function is associated with the adjacent graphically represented button of the first remote control.

17. The method of claim 15, wherein the second remote control comprises at least an up control, wherein the second control signal is initiated in response to a user selection of the up control on the second remote control, and further comprising:
    composing the second graphical representation of the first remote control, wherein movement of the cursor identifies the adjacent graphically represented button of the first remote control, wherein the adjacent graphically represented button is above the first one of the plurality of the graphically represented buttons.

18. The method of claim 15, wherein the second remote control comprises at least a down control, wherein the second control signal is initiated in response to a user selection of the down control on the second remote control, further comprising:
    composing the second graphical representation of the first remote control, wherein movement of the cursor identifies the adjacent graphically represented button of the first remote control, wherein the adjacent graphically represented button is below the first one of the plurality of the graphically represented buttons.

19. The method of claim 15, wherein the second remote control comprises at least a left control, wherein the second control signal is initiated in response to a user selection of the left control on the second remote control, further comprising:
    composing the second graphical representation of the first remote control, wherein movement of the cursor identifies the adjacent graphically represented button of the first remote control, wherein the adjacent graphically represented button is to a left of the first one of the plurality of the graphically represented buttons.

20. The method of claim 15, wherein the second remote control comprises at least a right control, wherein the second control signal is initiated in response to a user selection of the left control on the second remote control, further comprising:
    composing the second graphical representation of the first remote control, wherein movement of the cursor identifies the adjacent graphically represented button of the first remote control, wherein the adjacent graphically represented button is to a right of the first one of the plurality of the graphically represented buttons.

* * * * *